(12) United States Patent
McGuire et al.

(10) Patent No.: US 7,035,870 B2
(45) Date of Patent: Apr. 25, 2006

(54) OBJECT LOCKING IN A SHARED VM ENVIRONMENT

(75) Inventors: Richard K McGuire, Boston, MA (US); Edward J Slattery, Winchester (GB); Matthew A Webster, Hook (GB)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/093,425

(22) Filed: Mar. 7, 2002

(65) Prior Publication Data

US 2003/0097360 A1 May 22, 2003

(30) Foreign Application Priority Data

Oct. 19, 2001 (GB) .................................. 0125314.5

(51) Int. Cl.
*G06F 17/30* (2006.01)

(52) U.S. Cl. .......................... 707/103; 707/8; 707/200; 707/201; 707/203; 707/204

(58) Field of Classification Search ................ 707/103, 707/206, 8, 200, 201, 203, 204; 709/100, 709/316, 206; 711/118; 717/148, 140; 718/100, 718/104; 719/310, 320, 3
See application file for complete search history.

(56) References Cited

U.S. PATENT DOCUMENTS

| | | | |
|---|---|---|---|
| 5,553,291 A | 9/1996 | Tanaka et al. ............... 395/700 |
| 6,247,025 B1 | 6/2001 | Bacon ......................... 707/206 |
| 6,256,637 B1 * | 7/2001 | Venkatesh et al. ....... 707/103 Y |
| 6,671,707 B1 * | 12/2003 | Hudson et al. ............. 707/206 |
| 6,735,760 B1 * | 5/2004 | Dice ........................... 717/139 |
| 2002/0099765 A1 * | 7/2002 | Otis ............................. 709/203 |
| 2002/0138544 A1 * | 9/2002 | Long .......................... 709/107 |

OTHER PUBLICATIONS

"Inside the Java Machine" by Bill Venners, McGraw-Hill, ISBN 0-07-913248-0, 2nd Edition, Chapter 20. Available online at http://www.artima.com/insidejvm/ed2/ch20ThreadSynchronizationPrint.html.

* cited by examiner

*Primary Examiner*—Cam-Y Truong
(74) *Attorney, Agent, or Firm*—David A. Mims, Jr.

(57) ABSTRACT

A system is provided which comprises multiple Java virtual machines (VMs). Each VM is capable of running a plurality of threads. The system includes at least one object which is shared between the VMs so that it is accessible from two or more VMs, and at least one non-shared object which is accessible only from a single VM. In order to perform a lock operation on a shared object, it is first detecting that an object is a shared object. In a preferred embodiment, this is accomplished by locating a predefined value in a particular lock data word in the object. In response to the detection, a monitor is used to control local access to the shared object for the thread that is requesting the object. The monitor is on the same VM as the requesting thread. In addition, a data structure, which may be a proxy object, is updated in order to associate the monitor with the shared object.

19 Claims, 8 Drawing Sheets

OBJECT LOCKING IN A SHARED VM ENVIRONMENT

FIELD OF INVENTION

The present invention relates to object locking, and in particular to locking objects which can be shared across multiple virtual machines.

BACKGROUND OF THE INVENTION

In the Java programming environment (Java is a trademark of Sun Microsystems Inc.), programs are generally run on a virtual machine, rather than directly on hardware. Thus a Java program is typically compiled into byte-code form, and then interpreted by the Java virtual machine (VM) into hardware commands for the platform on which the Java VM is executing. The Java environment is further described in many books, for example "Exploring Java" by Niemeyer and Peck, O'Reilly & Associates, 1996, USA, "Java Virtual Machine", by Meyer and Downing, O'Reilly & Associates, 1997, USA, and "The Java Virtual Machine Specification" by Lindholm and Yellin, Addison-Wedley, 1997, USA.

Java is an object-oriented language. Thus a Java program is formed from a set of class files having methods that represent sequences of instructions. One Java object can call a method in another Java object. A hierarchy of classes can be defined, with each class inheriting properties (including methods) from those classes which are above it in the hierarchy. For any given class in the hierarchy, its descendants (i.e. below it) are called subclasses, whilst its ancestors (i.e. above it) are called superclasses. At run-time classes are loaded into the Java VM by one or more class loaders, which are themselves organised into a hierarchy. Objects can then be created as instantiations of these class files, and indeed the class files themselves are effectively loaded as objects.

The Java VM includes a heap, which is a memory structure used to store these objects. Once a program has finished with an object stored on the heap, the object can be deleted to free up space for other objects. In the Java environment, this deletion is performed automatically by a system garbage collector (GC). This scans the heap for objects which are no longer referenced, and hence are available for deletion. Note that the precise form of GC is not prescribed by the Java VM specification, and many different implementations are possible.

One limitation of the standard Java VM architecture is that it is generally designed to run only a single application (although this may be multithreaded). In a server environment used for database transactions and such-like, each transaction is typically performed as a separate application, rather than as different threads within an application. This is to ensure that every transaction starts with the Java VM in a clean state. In other words, a new Java VM is started for each transaction. Unfortunately however this results in an initial delay in running the application due to the overhead of having to start up (and then stop) a fresh Java VM for each new application. This can seriously degrade the scalability of Java server solutions.

Various attempts have been made to mitigate this problem. EP-962860-A describes a process whereby one Java VM can fork into a parent and a child process, this being quicker than setting up a fresh Java VM. The ability to run multiple processes in a Java-like system, thereby reducing overhead per application, is described in "Processes in KaffeOS: Isolation, Resource Management, and Sharing in Java" by G Back, W Hsieh, and J Lepreau (see:/flux/papers/kaffeos-osdi00/main.html at http://www.cs.utah.edu). Another approach is described in "Oracle JServer Scalability and Performance" by Jeremy Litzt, July 1999 (see: /database/documents/jserver_scalability_and_performance_t wp.pdf at http://www.oracle.com). The JServer product available from Oracle Corporation, USA, supports the concept of multiple sessions (a session effectively representing a transaction or application). Resources such as read-only bytecode information are shared between the various sessions, but each individual session appears to its client to be a dedicated conventional Java VM. Somewhat similarly, WO 00/52572 describes a mechanism for allowing Java classes to be shared between many Java VMs by using a shared memory pool for storing classes, and an associated Java layer class manager.

U.S. patent application Ser. No. 09/304160, filed 30 Apr. 1999 ("A long Running Reusable Extendible Virtual Machine"), assigned to IBM Corporation (IBM docket YOR9-1999-0170), discloses a virtual machine having two types of heap, a private heap and a shared heap. The former is intended primarily for storing application classes, whilst the latter is intended primarily for storing system classes and, as its name implies, is accessible to multiple VMs. The idea is that as each new VM is launched, it can access system classes already in the shared heap, without having to reload them, relink them, and so on, thereby saving significantly on start-up time. The shared memory can also be used for storing application classes that will be used by multiple VMs, with the private heap then being used for object instances specific to a particular application running on a VM.

A related idea is described in "Building a Java virtual machine for server applications: the JVM on OS/390" by Dillenberger et al, IBM Systems Journal, Vol 39/1, January 2000. This describes two types of Java VM, a resource-owning Java VM which loads and resolves necessary system classes, and subsequent "worker" Java VMs which can reuse the resolved classes. Again this implementation uses a shared heap to share system and potentially application classes for reuse by multiple workers, with each worker Java VM also maintaining a private or local heap to store data private to that particular Java VM process. A similar approach is described in U.S. patent application Ser. No. 09/584151, filed 31 May 2000, entitled "CLASS SHARING BETWEEN MULTIPLE VIRTUAL MACHINES" and assigned to IBM Corporation.

The idea behind such systems which run multiple Java VMs in parallel, is that a class can be loaded into a single VM, and then accessed and utilised by multiple other VMs, thereby saving memory and start-up time.

The adoption of multiple, parallel Java VMs with shared objects does introduce the problem of how to control potentially conflicting access by different VMs to the same object. This is an extension of a problem that already exists on a single VM, since as previously mentioned, the Java language supports multiple threads which can run concurrently. It is important to be able to control access to resources shared by different threads, in order to avoid potential conflict as regards the usage of a particular resource by the various threads.

In conventional (single system) Java VMs, locking is generally implemented by monitors which can be associated with objects (i.e. the locking is performed at the object level). A monitor can be used for example to exclusively lock a piece of code in an object associated with that monitor, so that only the thread that holds the lock for that object can run that piece of code—other threads will queue waiting for the lock to become free. The monitor can be used to control access to an object representing either a critical section of code or a resource.

Note that creating multithreaded applications in Java is relatively easy, partly because there is no need at the application level to specifically code lock and unlock operations. Rather, resource control is achieved by applying a "synchronized" statement to those code segments that must run atomically. The statement can be applied either to a whole method, or to a particular block of code within a method. In the former case, when a thread in a first object invokes a synchronised method in a second object, then the thread obtains a lock on that second object. This lock covers all the synchronised methods in that second object (this may or may not be desirable depending on the application). The alternative approach specifies a synchronised block of code within a method. This allows the lock to be held via an arbitrary object, as identified in the synchronised command. If the synchronised block of code is contained in a first object, and a second (arbitrary) object is used for the lock, then this lock does not prevent execution of other methods in the first object, or indeed other code in the method containing the synchronised block (outside the synchronised block itself).

One consequence of permitting synchronised blocks of code is that any Java object may be specified for locking, not just those involving synchronised code. This is important because it means that every object must include support for being locked. However, it is desirable to use as small a proportion of an object for locking as possible. This reflects the fact that many very small objects in practice are never likely to be locked, and so it is desirable to minimise the amount of space which would otherwise effectively be wasted for supporting locking in such objects.

Synchronised code in Java can also be used as a communication mechanism between separate threads of execution. This is achieved by a first thread including a "wait" command within synchronised code. This suspends execution of this first thread, and effectively allows another thread to obtain the lock controlling access to this synchronised code. Corresponding to the "wait" command is a "notify" command in synchronised code controlled by the same object lock. On execution of this "notify" command by a second thread, the first thread is resumed, although it cannot reacquire the lock until this is released by the second thread.

The usage of monitors in the execution of Java code is extensive. As noted above monitors are used frequently as programming constructs in user code, and Java class libraries included with the Java VM make heavy use of monitors. In addition, the core Java VM, which itself is partially written in Java, exploits the underlying locking structure to protect critical resources. Consequently, even single threaded applications can heavily utilise monitors, since the underlying Java libraries and core virtual machine are written to multithread.

Given the extensive use of the monitor structure in Java, the performance of the implementation is crucial to overall Java system performance. In this case performance is measured by the amount of time an acquire and release of a Java monitor consumes. The most important situation for performance, since it is by far the most common, is when a monitor is acquired without contention. That is, a thread successfully requests the monitor without blocking or waiting for another thread to release it.

Much work has been done on the design of Java object monitors. Of particular relevance to the present invention is U.S. Pat. No. 6,247,025 and the publication "Thin Locks: Featherweight Synchronisation for Java" by Bacon, Konuru, Murthy, and Serrano, SIGPLAN '98, Montreal Canada, p258–268. These documents teach the concept of a lightweight "flat" (or thin) monitor that can be incorporated into a single word within the header space available in a conventional Java object. The flat monitor can be used for the most common, simple case whereby a lock is obtained by a thread without contention from other threads, so no waiting/queuing is required. Essentially the flat monitor word includes three fields; firstly a single mode bit to determine whether the monitor is operating as a thin monitor, or as a conventional "fat" monitor (see below); secondly, a unique thread-id which identifies the owning thread (or zero if it is unowned); and finally a field to indicate how many times the same thread has currently locked the object. Thus this design accommodates recursive locking by the same thread up to a certain limit (based on the size of the third field). The single word of the flat monitor can then be tested and updated by the use of simple instructions that guarantee consistency and atomic updates (such as Compare and Swap on S/390).

If a thread tries to obtain a lock that is already held or if the monitor is required for a "wait/notify" call then the flat monitor cannot be used, since it does not contain enough complexity to handle queues of waiting threads. At this point a heavyweight "fat" monitor is assigned that can handle all these tasks. The flat monitor is then converted by changing the mode bit of the first field to indicate that a fat monitor is now being used, and by combining the second and third fields to provide a pointer to the associated heavyweight monitor. This heavyweight monitor is known as an "inflated" monitor and the switch to using the inflated monitor instead of the flat monitor is known as "inflation". (It will be appreciated that all this extra functionality for locking is performed by the underlying Java VM transparently to the application).

The use of fat and thin monitors is illustrated in FIGS. 4A and 4B. These Figures depict an object 400 including a 32-bit word 410 used to store locking information. The last eight bits 414 of word 410 are used to store type information and flags containing information about the object, which are not of direct interest at present. The first bit 411 of word 410 is used to indicate whether or not the monitor is inflated, in other words whether the monitor is in its thin state (shape bit=0) or its fat state (shape bit=1). The former case is illustrated in FIG. 4A, in which the remaining bits in word 410 are divided into two fields. The first of these 412 (15 bits) is used to store the identity of the thread that currently owns the monitor (this is set to zero if there is no current owner of the lock), whilst the second field 413 (8 bits) is used to store a recursion count, that permits nested locking of an object by the same thread.

FIG. 4B illustrates the situation after the monitor has been inflated. Fields 412 and 413 (thread id and recursion count) from the flat state of FIG. 4A have now been combined into a single field 422 (23 bits), which points into a monitor identity (MI) table 430. Also shown in FIG. 4B is a pool 460 of fat or heavyweight monitor structures, each of which is capable of provided full locking support—i.e. maintaining a queue of threads waiting to own its corresponding object, and so on. Index 422 points to a particular entry 431 in the MI table, which in turn references the particular system monitor 461 that is being used to regulate access to object 400.

Further details on the use of these bi-modal monitors in the IBM Java VM implementation can also be found in the papers: "Java Server Performance: A Case Study of Building Efficient, Scalable JVMs", by Dimpsey, Arora, and Kuiper, and "The evolution of a high-performing Java virtual machine", by Gu, Burns, Collins, and Wong, both in the IBM Systems Journal, Vol. 39/1, January 2000.

In the above implementations of bi-modal locking, once inflation has occurred it persists for the life of the object, even after all locks on it have been removed. Consequently, the code paths for any lock/unlock are greatly increased, even for the simple case in which a thread obtains an unowned monitor, since now the heavyweight monitor mechanism must be used. Therefore, the high performance case introduced through flat locks occurs only if the monitor is in the flat mode (i.e. has never been inflated). Once inflation has occurred, perhaps as a result of one short burst of initial activity, the lower performing monitor implementation must be employed. This is particularly disadvantageous in a server environment, where a Java VM may run for a long time, and there is the possibility that more and more objects will go into the inflated state.

This problem is addressed in a paper: "A Study of Locking Objects with Bimodal Fields" by Onodera and Kawachiya, OOPSLA '99 Conference Proceedings, p223–237, Denver Colo., USA, November 1999. At a high-level, this proposes "deflation", which is the transition from a fat monitor back to a flat or thin monitor, in association with so-called "Tasuki Monitors" (these are based on the bi-modal monitors described above). Thus when a thread exits an object that is inflated (as indicated by the mode bit), it will, subject to certain conditions, return the object from using a fat monitor to a thin monitor. This is accomplished by changing the mode bit in the object header and writing a null value into the owning thread identifier to replace the monitor pointer. Note that the fat monitor itself does not need to be altered.

In order to determine when best to deflate, Onodera divides objects that are inflated into two groups. The first (the "nowait" group) is only involved in mutual exclusion by monitor enter and exit (i.e. standard synchronisation), whereas the second (the "wait" group) includes application wait/notify operations. Onodera only performs deflation on objects in the "nowait" group. This is accomplished by simply adding a wait-counter to an object monitor, the counter being incremented whenever the wait_object function is called. Thus deflation is not performed on any object for which the wait-counter is non-zero.

The rationale for this approach is the recognition that rapidly repeated inflation/deflation cycles will have an adverse effect on machine performance ("thrashing"). Thus an object should be left inflated if deflation would be followed by imminent re-inflation, in other words if the intervals between periods of contention for the object are short (a property termed "locality of contention"). Onodera presents experimental data to indicate that this condition is met by objects in the wait group, but not by objects in the nowait group. Consequently, it is only objects in the latter group (as indicated by a zero wait-counter) that are deflated at the end of a period of contention. Further experimental data is adduced to show that thrashing is not a problem in such an implementation.

An enhancement to the Onodera approach is described in U.S. patent application Ser. No. 09/574,137 entitled "MULTIPLE MODE OBJECT LOCKING METHOD AND SYSTEM", filed 18 May 2000 (IBM docket number GB9-2000-0016). This maintains a counter to indicate the number of times a monitor has been inflated, and monitors which have a high counter value are never deflated, even when there is no longer any contention for them. This is because if they were deflated, the likelihood is that they would have to be reinflated shortly afterwards, and it is more efficient to simply leave them in the inflated state throughout. Note that the counter is reset at each garbage collection, to distinguish objects for which there genuinely is frequent contention from those objects which are simply very long-lived.

This earlier work on locking has been concerned with a single Java VM, but as previously discussed, some form of locking must also be provided in a shared Java VM environment. In the aforementioned WO 00/52572, objects in the shared memory pool are locked so that they can only be accessed by a single Java VM at a time. Note that the implementation therein is focussed on reducing memory requirements. However, this approach does not map well to a server environment, since the effect is for one Java VM to be able to suspend the other Java VMs. This leads to serious scalability problems in terms of performance, as one Java VM holds up the others, and also reliability (what happens if the Java VM holding a lock crashes, or if there is a deadlock between different Java VMs).

The desired behaviour is for synchronization on a shared object from a particular Java VM to only impact threads running on that particular Java VM. In addition, it is desirable for such synchronization to be achieved without sacrificing the very significant performance benefits obtained through advanced bimodal locking strategies on a single Java VM (since otherwise the whole rationale for sharing objects across multiple Java VMs could be undermined).

DISCLOSURE OF THE INVENTION

Accordingly, the invention provides a method of operating a system comprising multiple virtual machines (VMs), each VM capable of running a plurality of execution processes, said system including at least one object which is shared between the VMs so that it is accessible from two or more VMs, and at least one non-shared object which is accessible only from a single VM, said method performing lock operations on a shared object by the steps of: detecting that an object is a shared object; responsive to said detection, utilising a monitor to control local access to a shared object for an execution process, said monitor being on the same VM as said execution process; and updating a data structure to associate said monitor with the shared object.

This approach provides local locking in a shared VM system, in that the lock only impacts execution processes on a single VM (in this context an execution process represents any suitable strand or unit of execution which can obtain ownership of a resource; in a Java environment this would typically be a thread). Consequently, as far as an application is concerned, the different VMs can operate essentially independently of one another, thereby avoiding the scalability problems of having locks on a shared object that become effective globally (i.e. across multiple VMs). One important aspect of this is that by avoiding global locks, the overall system is much more robust, since a failing VM whose locks for a shared object hang should not adversely affect other VMs that need to use that shared object.

An important aspect of the invention is the need to maintain conformity with the locking implementation on a single VM. Thus in a preferred embodiment, an object contains a lock data word (this may be any suitable size or format; it is not limited to a single machine word). In a non-shared object this word is used to contain a reference to a monitor that controls access to the non-shared object, typically in conformity with standard prior art locking on a single Java VM. However, for a non-shared object, this word contains a predefined value. Thus it is possible to detect that an object is a shared object by investigating whether its lock data word contains said predefined value. It would be possible to detect shared objects by some other mechanism (for example by looking to see if they were in shared memory space). However, since the preferred approach exploits fields that are already present in an object for locking, it is consistent with most existing code (provided for locking on a single VM), and likely to provide optimum performance.

As discussed above, known prior art systems on a single VM support bimodal locking, in which said lock data word can be set in a first mode to act as a flat monitor, and in a second mode to act as a reference to an inflated monitor. A flat monitor is stored within the lock data word of the object itself, and so provides very fast locking performance, but a separate (inflated) monitor must be utilised to handle more complicated constructs, such as wait-notify structures, or a queue of waiting threads. The locking mechanism of the preferred embodiment for shared objects is fully compatible with the use of such bimodal locking (although it does not require it to be used).

In particular, in the preferred embodiment, the lock data word includes a flag to indicate whether the lock data word is in said first or second mode, and said flag is set to the second mode for a shared object. The underlying purpose here is to match speed to frequency of occurrence, so that common operations are the quickest, thereby maximising overall performance. Thus in the preferred embodiment, a first check is to see if an object is in the first or second mode; if the former it must be a flat monitor for a non-shared object, and so it can be processed accordingly. Note that the path length for this situation, which is the most common, for non-contended access to a non-shared object, has not been extended at all to accommodate locking of shared objects, thereby retaining the full benefits of bimodal locking. Alternatively, if the flag indicates that the object is in its second mode, then the lock data word is examined to see whether or not it has the predefined value; if not, then the word references a conventional (inflated) monitor for a non-shared object, and operations can proceed accordingly. Note that the added path length here to support shared object locking is just this single comparison against the predefined value, which is a relatively minor hit compared to overall monitor operations.

Turning now to the processing of shared objects, in a preferred embodiment, each VM includes a data structure to associate shared objects with monitors on that VM (this is more robust and flexible than having a single, global data structure). Such a data structure is necessary because in the preferred embodiment all shared objects have the same predefined value, and so it is not possible to identify a monitor directly from the object (unlike for conventional monitors). Note that the use of a data structure is slower than the direct access of conventional monitors on a single system, but this is acceptable because locking shared objects is presumed to be a relatively rare occurrence.

There are a variety of possibilities for the data structure. In one preferred embodiment, there are local proxies of the shared objects that store a certain amount of information from or relating to the shared object itself. This located proxy can be used to contain a reference to a monitor for controlling local access to the shared object, and can, if desired, support bimodal locking (i.e. it could also be used as a flat monitor). Typically the data structure in this implementation would further comprise a table that allows quick identification of the relevant proxy based on the identify of the shared object.

Another preferred embodiment does not have object proxies, but rather supports a special table, which stores the local locking information for all shared objects being utilised on this VM. Note that this information may simply identify a local system monitor for the shared object (or allow identification of this monitor via some intermediate table), or it may itself support bimodal locking if desired, by providing a field which can be utilised either as a flat monitor, or a reference to the local system monitor.

It will be appreciated that the decision of whether or not to utilise local proxies may well depend on whether they are needed to support other aspects of the shared environment. This in turn may vary according to the type of shared object (i.e. a shared environment may utilise local proxies only for certain types of object).

The invention further provides a system comprising multiple virtual machines (VMs), each VM capable of running a plurality of execution processes, said system including at least one object which is shared between the VMs so that it is accessible from two or more VMs, and at least one non-shared object which is accessible only from a single VM, said system including means for performing lock operations on a shared object comprising: means for detecting that an object is a shared object; a monitor for controlling local access to a shared object for an execution process, said monitor being on the same VM as said execution process; and a data structure for associating said monitor with the shared object.

The invention further provides a computer program product comprising instructions encoded on a computer readable medium for causing a computer to perform the methods described above. A suitable computer readable medium may be a DVD or computer disk, or the instructions may be encoded in a signal transmitted over a network from a server. These instructions can then be loaded into memory (e.g. RAM) of a computer system, for execution by a processor to implement the relevant methods. It will be appreciated that the computer system and program product of the invention will generally benefit from the same preferred features as the method of the invention.

BRIEF DESCRIPTION OF THE DRAWINGS

Various preferred embodiments of the invention will now be described in detail by way of example only with reference to the following drawings.

DESCRIPTION OF THE PREFERRED EMBODIMENTS

Figure 1:
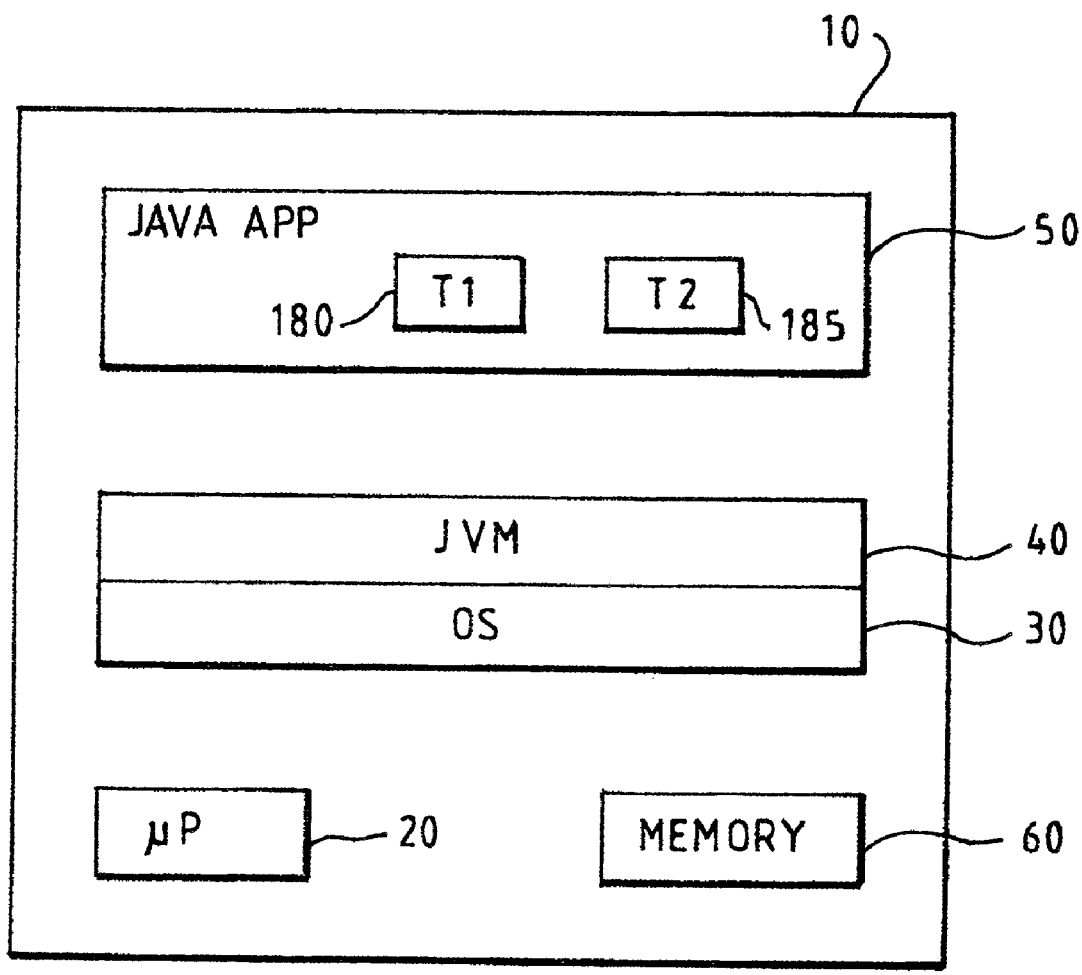
FIG. 1 is a high-level schematic diagram of a single Java VM.

In order to better appreciate the invention, the known structure of a single Java VM will now be described, with reference to FIGS. 1 and 2. Thus FIG. 1 illustrates a computer system 10 including a (micro)processor 20 which is used to run software loaded into memory 60. The software can be loaded into the memory by various means (not shown), for example from a removable storage device such as a floppy disk or CD ROM, or over a network such as a local area network (LAN) or telephone/modem (wired or wireless) connection, typically via a hard disk drive (also not shown). Computer system 10 runs an operating system (OS) 30, on top of which is provided a Java virtual machine (VM) 40. The Java VM 40 looks like an application to the (native) OS 30, but in fact functions itself as a virtual operating system, supporting Java application 50, which potentially includes multiple threads, e.g. T1 180 and T2 185.

It will be appreciated that computer system 10 can be a standard personal computer or workstation, minicomputer, mainframe, palmtop, or any other suitable computing device, and will typically include many other components (not shown) such as display screen, keyboard, sound card, network adapter card, etc. which are not directly relevant to an understanding of the present invention. Note that computer system 10 may also be an embedded system, such as a set top box, or any other hardware device including a processor 20 and control software 30, 40.

Figure 2:
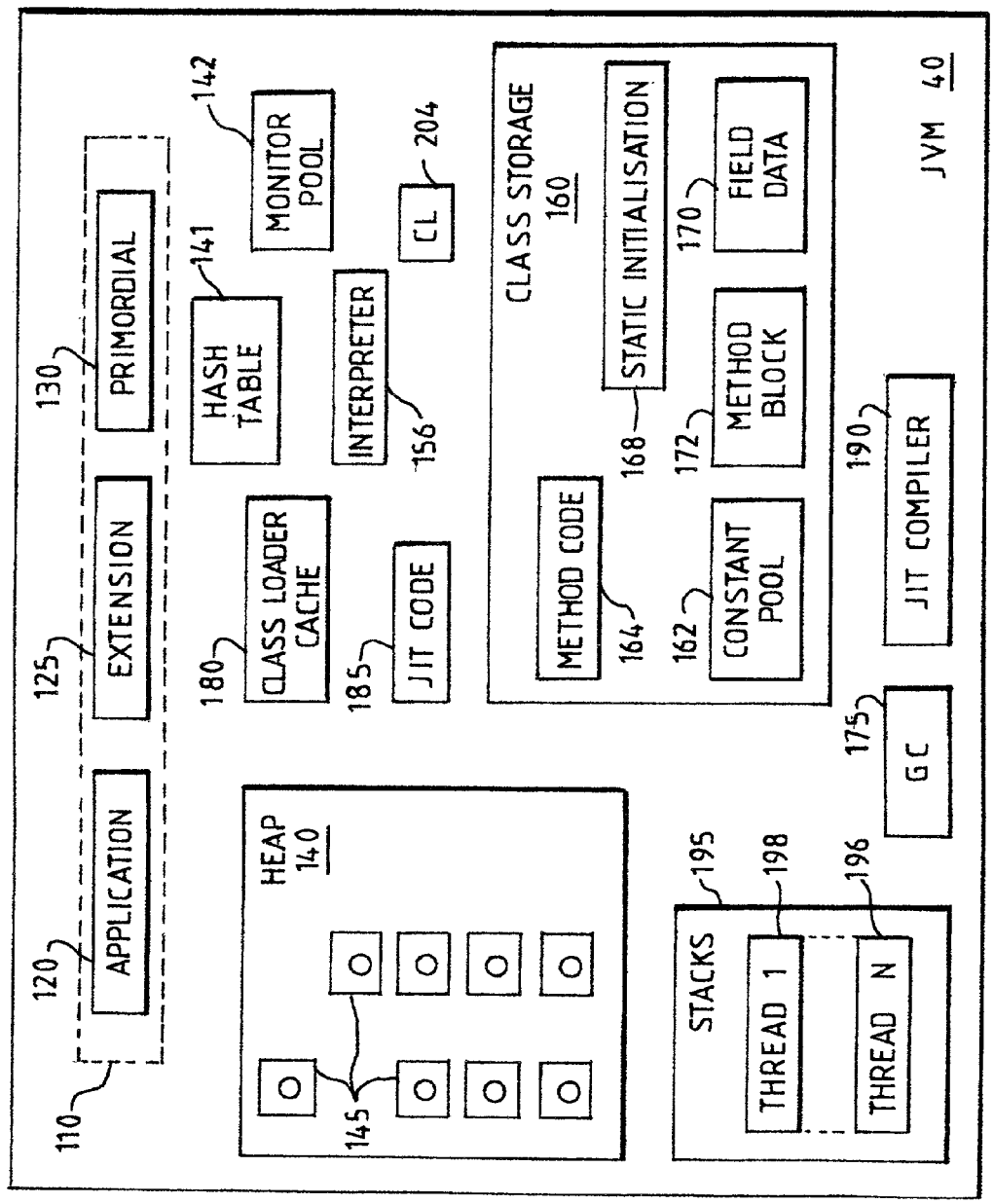
FIG. 2 illustrates the internal components of the Java VM in more detail.

FIG. 2 shows the structure of Java VM 40 in more detail (omitting some components which are not directly pertinent to an understanding of the present invention). The fundamental unit of a Java program is the class, and thus in order to run any application the Java VM must first load the classes forming and required by that application. For this purpose the Java VM includes a hierarchy of class loaders 110, which conventionally includes three particular class loaders, named Application 120, Extension 125, and Primordial 130. The Java VM further includes a component CL 204, which also represents a class loader unit, but at a lower level. In other words, this is the component that actually interacts with the operating system to perform the class loading on behalf of the different (Java) class loaders 110.

Also present in the Java VM is a heap 140, which is used for storage of objects 145. Each loaded class represents an object, and therefore can be found on the heap. In Java a class effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2).

The Java VM also includes a class storage area 160, which is used for storing information relating to the class files stored as objects in the heap 140. This area includes the method code region 164 for storing byte code for implementing class method calls, and a constant pool 162 for storing strings and other constants associated with a class. The class storage area also includes a field data region 170 for sharing static variables (static in this case implies belonging to the class rather than individual instances of the class, or, to put this another way, shared between all instances of a class), and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc. in class storage area 160. They also contain a reference to the class loader which loaded them into the heap, plus other fields such as a flag (not shown) to indicate whether or not they have been initialised.

FIG. 2 further shows a monitor pool 142. This contains a set of locks (monitors) that are used to control access to an object by different threads. In the simplest locking model, when a thread requires exclusive access to an object, it first obtains ownership of its corresponding monitor, which maintains a queue of threads waiting for access to the object. Hash table 141 is used to map from an object in the heap to its associated monitor. As described in detail above, bi-modal locking systems are also used, which have an inflated (fat) state and a non-inflated (thin) state. In the former case, access to an object is controlled by a monitor from the monitor pool 142, but in the latter case access is controlled by a field within the object itself. This is discussed in more detail below.

Note that whilst it is perhaps most straightforward to think of monitor pool 142 containing one monitor for each object in heap 140, this may not necessarily be so in a specific implementation. For example, with bimodal locks, there may only be one (fat) monitor for each existing thread. This is because a monitor will only be fat if there is at least one thread waiting on it (either to enter the monitor, or through a wait-notify construct), and a thread can only wait on one object at a time.

Another component of the Java VM is the interpreter 156, which is responsible for reading in Java byte code from loaded classes, and converting this into machine instructions for the relevant platform. From the perspective of a Java application, the interpreter effectively simulates the operation of a processor for the virtual machine. The Java VM further includes stack area 195, which is used for storing the stacks 196, 198 associated with the execution of different threads on the Java VM.

Also included within the Java VM are class loader cache 180 and garbage collection (GC) unit 175. The former is a table used to allow a class loader to trace those classes which it initially loaded into the Java VM. The class loader cache therefore permits each class loader to check whether it has loaded a particular class. Note also that it is part of the overall security policy of the Java VM that classes will typically have different levels of permission within the system based on the identity of the class loader by which they were originally loaded. Garbage collection (GC) facility 175 is used to delete objects from heap 140 when those objects are no longer required.

The Java VM further includes a just-in-time (JIT) compiler 190. This forms machine code to run directly on the native platform by a compilation process from the class files. The machine code is created typically when the application program is started up or when some other usage criterion is met, and is then stored for future use. This improves run-time performance by avoiding the need for this code to be interpreted later (perhaps repeatedly) by the interpreter 156.

It will be appreciated of course that FIG. 2 is simplified, and omits many components not directly relevant to an understanding of the present invention. Thus for example the heap may contain thousands of Java objects in order to run Java application 50, and the Java VM typically contains many other units (not shown) such as diagnostic facilities, etc.

Figure 3:
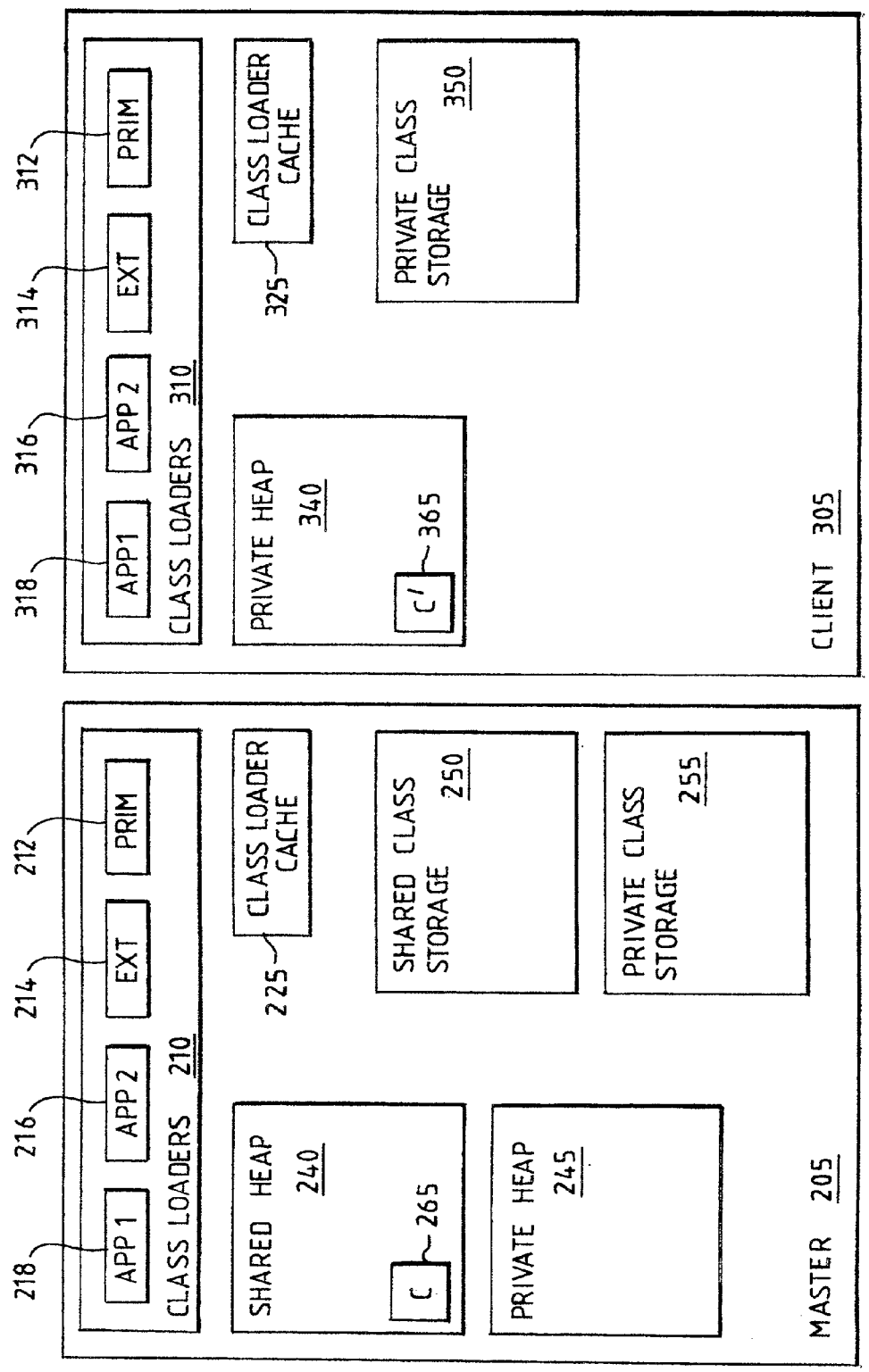
FIG. 3 illustrates a master and a client or worker Java VM in a shared Java VM environment.

FIG. 3 illustrates an architecture in accordance with a preferred embodiment of the present invention in which there is a master Java VM 205, and one or more client Java VMs 305 (FIG. 3 shows only one client Java VM associated with the master Java VM, but typically there will be many more). The master and client Java VMs represent standard Java VMs, except as will now be described (note that many of the details of standard Java VM componentry shown in FIG. 2 are omitted from FIG. 3 in order to enhance clarity of those aspects of particular relevance to an understanding of the present invention).

The master Java VM and client Java VM each include the same set of class loaders 210, 310. This includes one more class loader than shown in FIG. 2, in that there are now two application loaders (App1, App2; 216, 218, 316, 318). The motive for this additional class loader will be described below, although it will be appreciated that the invention may be implemented with fewer or more class loaders. Each Java VM also has a class loader cache 225, 325, which as before is used to map from a particular class loader to the classes that it has loaded.

The master and the client Java VMs both include a heap and a class storage area. For the master Java VM the heap is divided into a shared heap 240 and a private heap 245, and similarly the class storage area is divided into a shared area 250 and a private area 255. In contrast, the client JVM has just a private heap 340 and a private class storage area 350. The private heap and class storage are only accessible from within the owning Java VM, whereas the shared heap and shared class storage of the master Java VM are placed in a memory location which is accessible to all the client Java VMs associated with that master Java VM. Included within the shared heap in the master Java VM is a class file 265, which is mirrored by class file 365 within the private heap on the client JavaVM, as will be described in more detail below.

The system shown in FIG. 3 is started by invoking a Java VM with a run-time option to indicate that it is to become a master Java VM. The Java VM then returns a token which can be used for subsequent invocations of client Java VMs. The token allows the client Java VMs to determine the location of the shared heap and class storage in the master Java VM. The master Java VM then loads the necessary system and application classes. This is performed in substantially the conventional fashion, except that each class loader in the master Java VM can be specified as shared or private. In the former case the classes are loaded into the shared heap and class storage, in the latter case they are loaded into the private heap and storage.

In the preferred embodiment by default the class loaders are all shared, except for one of the application class loaders. It will be appreciated that this allows a user to control which classes go into the shared and local heaps, simply by altering the class path definitions of the class loaders and/or the locations of the class files. Note that no changes to the application code itself are required. Typically the master Java VM will then load all the system and application classes required, for example for transaction processing, into shared memory, thereby avoiding the need for subsequent client Java VMs to perform this task. This significantly reduces the start-up time of a client Java VM. After this, the master Java VM is ideally left with as little as possible to perform. This is because the master Java VM is the owner of the shared heap, and if it crashes, the shared heap goes down with it, and this will also bring down all the client Java VMs. Note that no garbage collection is performed on the shared heap 240 of the master Java VM, in order to ensure that these class files are available for future client Java VMs to use.

Considering now the operation of a client Java VM, this has the same mix of shared and private class loaders as the master Java VM. Note that there may be variations in terms of the private class loaders between the master Java VM and its various clients, but the family of Java VMs must all have the same shared class loaders; moreover these must be located in the same place in the class loader hierarchy. This is necessary to ensure consistent behaviour, for example in terms of class resolution, and also for security reasons.

The private class loaders of a client Java VM operate in essentially the same way as the private class loaders in the master Java VM (and analogous to a conventional class loader). However, there are certain distinctions in the way in which a shared class loader operates in a client Java VM. Thus the first operation of a shared class loader for loading a class is to check whether the requested class is present in the local class loader cache 325 on the client Java VM. A positive outcome here would indicate that class has already been loaded by the class loader, and so no further action is required. Assuming on the other hand that the class has not yet been loaded, the class loader then looks for the class in the class loader cache of the master Java VM 225, or more particularly in that part of the class loader cache in the master Java VM that corresponds to that shared class loader.

If the class is not present in the master class loader cache, then it must be loaded into the shared memory 240 of the master Java VM. Once this has been done, or if the class was already there (e.g. as class 265), the client Java VM class loader creates a shell or ghost copy of the class 365 on the local heap 340, and likewise creates certain data concerning that object corresponding to the information in the shared class storage (250) (the details of this step will be provided below). Finally, an entry for this class is made in the class loader cache 325 on the client Java VM. The class is now effectively loaded into the client Java VM, and so can be linked and initialised and then utilised by the application running on the client Java VM.

As indicated above, information from the shared heap and class storage area in the master Java VM needs to be mirrored into the private counterpart (i.e. ghost copy) of an object on the client Java VM. In general it is desirable to minimise such mirroring, in order to avoid the client Java VM having to duplicate items that have already been stored by the master Java VM. In the preferred embodiment, the fields of object 265 that need to be created in shell object 365 include:

| | |
|---|---|
| Loader | (a pointer to the ClassLoader instance which loaded the class) |
| init_thread | id of the thread which initializes the class |
| Signers | security information |
| protection domain | " |
| last_subclass_of | an optimisation field specific to a Java VM implementation |
| memory_table | |
| some flags | error, initialised, mirrored, cached, locking |

These mirrored fields can then be populated with values appropriate to the ghost class 365. For example, the initialisation flag will not be set, irrespective of the status of the initialisation flag of the class 265 in the shared memory. This then allows an initialisation to be performed on the local Java VM, in accordance with the Java VM specification. Note that the complete list of fields to be mirrored will be dependent on the particular Java VM implementation, and is influenced by how locking is performed, how garbage collection is performed, and so on.

In addition to mirrored class file 365, certain items associated with the class file need also to be copied from the shared class storage area of the master Java VM to the private storage area of the client Java VM, in particular, the field data and the method block. Finally JIT code 185 can also be shared between Java VMs, in other words, this does not have to be copied to the client Java VMs.

The result of the above approach is that the client Java VM behaves just as any conventional Java VM from the perspective of the application. The only difference is the start up of this Java VM is significantly quicker, in that many of the classes are already available in the shared memory of the master Java VM. As mentioned above, a shared class is initialised separately for each client Java VM, by virtue of the private initialisation flag stored in the shell copy of the class. Subsequent operation of the client Java VM essentially follows standard Java VM operations, with the exception that (transparent to the application) some of the class files and information are actually being accessed in shared memory belonging to the master Java VM rather than to the client Java VM itself.

Considering now the implementation of locking in a shared Java VM environment, one can envisage an implementation where the lock for a shared object is also held in shared memory, and is effective across the full set of master and client Java VMs. This could be the case irrespective of whether the lock is in non-inflated mode (held within the object itself), or in inflated mode (maintained by a separate monitor).

A major difficulty with this approach is what happens should a Java VM go down (crash), whilst still retaining locks on certain objects. This may result in a non-existent process retaining outstanding locks, and potentially suspend indefinitely other Java VMs waiting for the release of such locks. A further risk is that the process ID of the crashed Java VM might be reused by a subsequent process (i.e. a newly created client Java VM), which would cause the lock to become active again unexpectedly. Although in principle a daemon process could be set up to check for unused locks (such as when the owning Java VM has crashed), this is a complex task, and is prone to many error conditions.

In addition, the shared lock approach undermines the requirement that a transaction running in one Java VM must have no knowledge or dependency on any other transaction (in other words, the existence of multiple Java VMs must be transparent to an application). This is because if an object is allowed to lock across Java VMs, then a transaction could get suspended waiting for an object owned by another transaction. Consequently, in the case of synchronization on an object, the desired outcome of locking must be that only the Java VM which locks the object is affected; i.e. only the threads within that Java VM are synchronized.

Another important constraint is that the existing (bi-modal) non-shared object locking model described above must be maintained, since it is performance critical. However, this requirement is problematic because in bi-modal locking, ownership of a flat (non-inflated) lock is repre-sented by a thread identifier. Such an identifier is unique within a single Java VM, but not across multiple Java VMs representing different processes. A similar difficulty exists in the case of fat (inflated) monitors. Here, a locked object contains an index into table 141 (see FIG. 2), which in turn is used to identify the associated monitor in pool 142. The indices used to access table 141 are again unique only to a single Java VM, rather than across multiple Java VMs representing different processes. Clearly the locking mechanism becomes completely unreliable if it is not possible to correctly (uniquely) identify the thread that owns an object, or the monitor that controls ownership of an object. Therefore, the prior art approach to bi-modal locking cannot be automatically extended across multiple Java VMs.

Figure 4A:
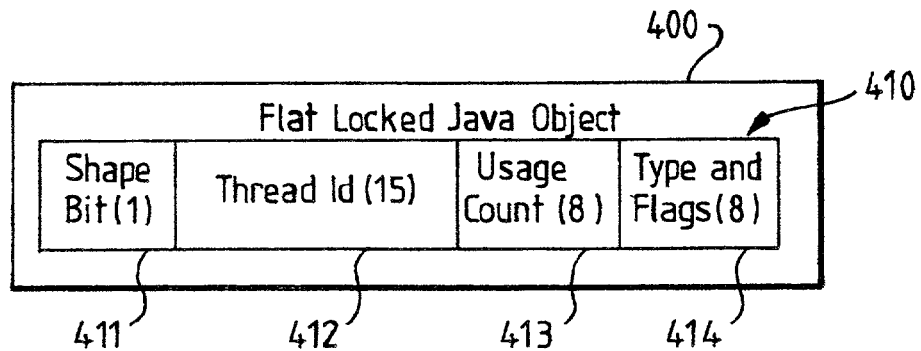
FIG. 4A illustrates a prior art bimodal lock in flat form and FIG. 4B illustrates a prior art bimodal lock in inflated form.
Figure 4B:
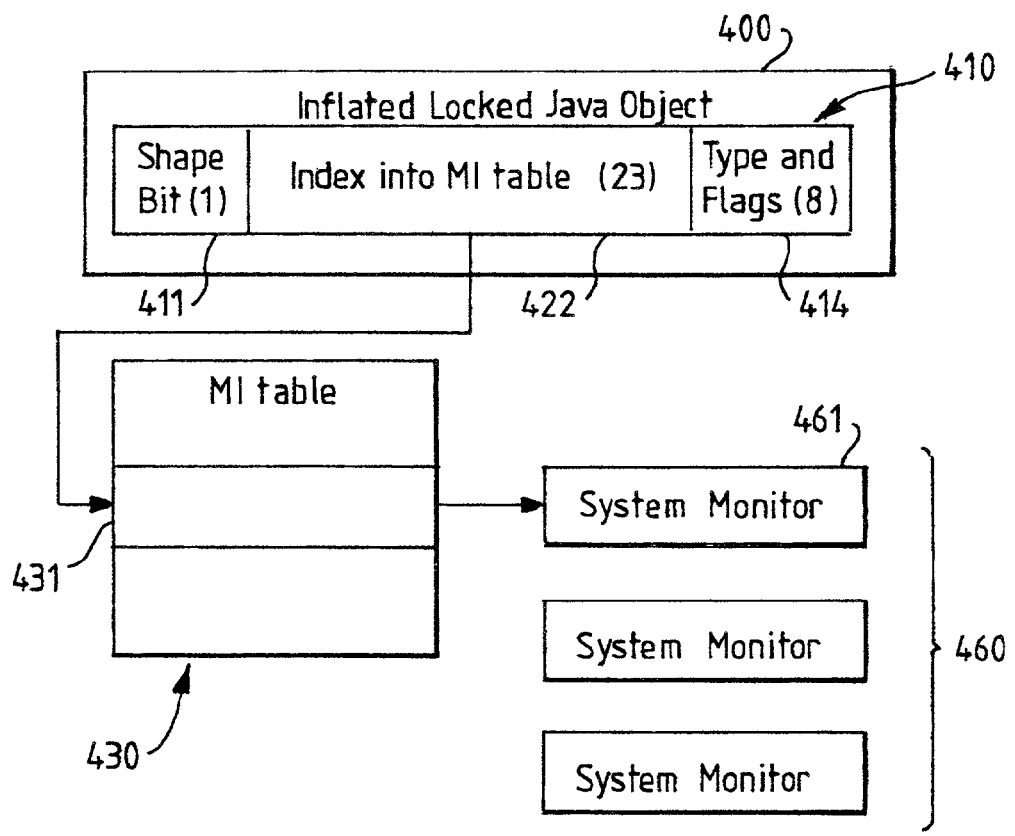
Figure 5:
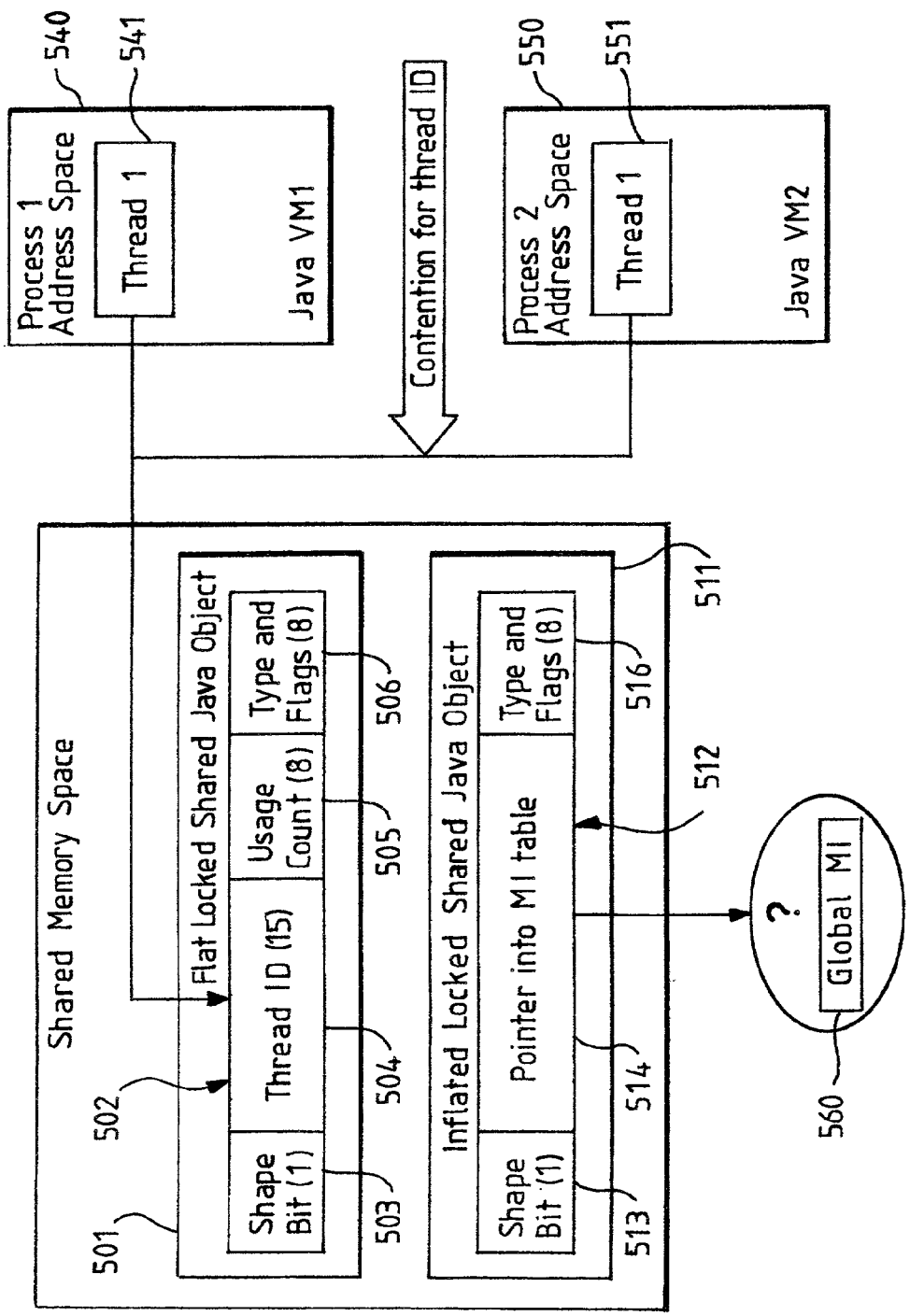
FIG. 5 is schematic diagram illustrating some of the problems that may arise in trying to utilize the bimodal locks of FIGS. 4A and 4B in a shared Java VM environment.

These problems are illustrated in FIG. 5, which depicts a naive attempt to apply the bimodal locking structure of FIGS. 4A and 4B to a shared memory/multiple Java VM environment. In particular, FIG. 5 shows a first object 501 in shared memory space and having a lock word 502 representing a flat monitor, containing shape bit 503, thread id 504, count 505 and flags 506 as previously described in relation to FIG. 4A. Similarly FIG. 5 also shows a second object 511 in shared memory space having a lock word 512 representing a fat monitor, and containing shape bit 513, pointer to MI table 514, and flags 516.

A first potential difficulty arises in respect of flat monitor 502, in that thread id may not be unique across the whole system of multiple Java VMs. Thus FIG. 5 illustrates two different processes, 540, 550, corresponding to different Java VMs, each of which includes a respective thread 541, 551. It is perfectly possible for threads 541 and 551 to share the same thread id, since these are not guaranteed to be unique across different processes, in which case operation of flat monitor 502 becomes very confused.

A difficult also exists with respect to fat monitor 512. Thus it would be expected that field 514 from this monitor would index a MI table, allowing the controlling monitor to be identified for object 560. However, if a global MI table is used 560 (and presumably therefore global monitors), then a single monitor becomes effective for controlling access to an object across all Java VMs, and the independence of the different Java VMs is lost.

Note that one possibility to resolve such issues is to allow more space in an object for storing lock information; for example having both process id and thread id in a flat monitor would allow unique identification of an owning thread. However, this approach is highly unattractive in practice, since space within an object is at a premium. In addition, this approach would also create a further level of complexity, thereby degrading performance.

The preferred embodiment of the present invention therefore adopts a somewhat different locking mechanism for shared objects that refers a calling application back to its own address space (i.e. its own Java VM). This ensures that the scope of such locks is localised to a single Java VM.

One factor underlying this approach is that in the preferred embodiment, shared objects cannot be changed by an application after they have been loaded; in other words, the Java VMs are only permitted Read access to shared objects. This requirement actually follows naturally from the desire to ensure that the different Java VMs are independent of each other. Thus if this were not the case, a first Java VM could write a value to a shared object, only to find later that it had been changed (unaccountably) by a second Java VM.

In fact, in the preferred embodiment, only two types of shared objects are supported, namely class objects and interned strings. The latter arise when string objects are created by a Java VM; if the new string object is created which matches a string already exists, then the system gives back the address of the existing string in the interned string table. Both class objects and interned strings are immutable, in the sense that they cannot be subsequently modified by an application.

Note that interned strings clearly cannot be locked by virtue of having a synchronised method within them. In the case of classes, although these can define a method, threads will generally create object instantiations of the class to run the method, and hence it will be these object instantiations that are locked by a synchronised method, rather than the class object itself. Nevertheless, since class objects and interned strings are still Java objects, they can be referenced by a synchronised block of code to lock access to that code. Thus it remains necessary to provide a locking mechanism with respect to shared objects. In addition, it is possible to define static methods within a class. These are run directly from the class object itself rather than some object instantiation, and can in principle be synchronised like any other method. Accordingly, the use of static, synchronised methods does require locking of the relevant class object.

Considering now the specific locking mechanism of the preferred embodiment, this recognises that certain aspects of locking are more critical to performance than others. Indeed, this was already a characteristic of bi-modal locking, which is based on the observation that contended monitor access is generally far rarer than uncontended access. Extending this approach, we can therefore define the following hierarchy, in which the objects are listed in order of decreasing sensitivity for performance:

(a) flat locked non-shared objects;
(b) inflated non-shared object monitors;
(c) shared objects.

There are two main reasons why locking performance on shared objects is relatively unimportant. Firstly, such shared objects tend to represent a rather small proportion of the total of all objects used in the master/client Java VM configuration. Secondly, it is relatively unlikely that such shared objects will in fact be locked, since, as explained above, this will only occur if they are referenced by a block of synchronised code in another object or if there are static synchronised methods within a class. (Indeed, from a programming point of view, it is probably best to try to completely avoid locks on shared objects).

The preferred embodiment exploits the above hierarchy by predefining a particular value (e.g. all ones) for the MI index that indicates a shared object. Thus whenever a shared object is created, the shape bit is preset to its inflated value 1, and the MI index is preset to the defined value (all ones), so that the top three-quarters of the lock word, including the shape bit and MI index, is 0xFFFFFF. This allows the monitor processing code to quickly identify whether or not a shared object is being considered; if not, conventional monitor operations for a standalone Java VM can be pursued.

On the other hand, if the lock word does indicate that the object is a shared object, then the subsequent monitor processing needs to allow for this fact. In the preferred embodiment, the manner in which this is accomplished depends on the type of shared object, i.e. whether a class object or an interned string.

This can be determined by looking at the type information stored in each object (in field 414 in FIG. 4A).

Figure 6:
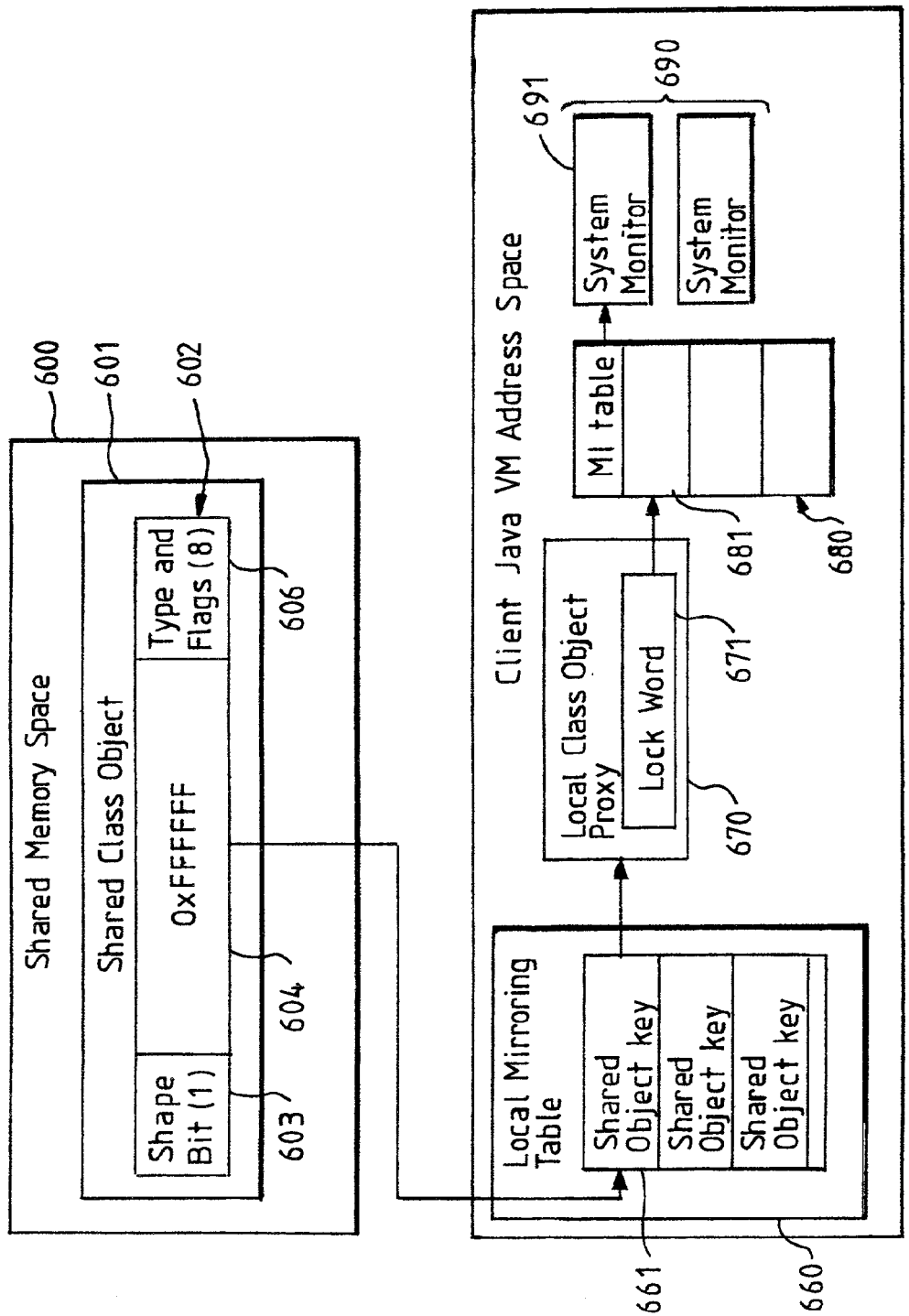
FIG. 6 illustrates the locking arrangement for a shared class object.

The situation in the former case is illustrated in FIG. 6, which depicts a shared object 601 in shared memory 600.

The shared object includes a word 602 used for storing locking information, as per FIG. 4B. Because object 601 is in shared memory, word 602 is set to its inflated form, which comprises three fields, essentially the same arrangement as in FIG. 4B. The first of these is a shape bit 603, set to one to indicate the inflated form. In a non-shared object, the second field 604 would represent the MI index, or pointer to the MI block. However, for a shared object, this field is set to all 1's, so that the combination of the first two fields 603, 604 have the value 0xFFFFF The final field 606 in word 601 is used for storing type information and flags, the same as for FIG. 4B.

Also shown in FIG. 6 is the address space 650 of a client Java VM, that has its own copy of shared object 601. In particular, the client Java VM includes a ghost class or proxy object 670 that mirror, shared object 601. The nature of this proxy object has already been described in relation to FIG. 3 (see in particular ghost class 365 in private heap 340), and it is used for storing selective local information about the shared object.

In particular, the proxy object 670 includes its own lock word 671, that is structured essentially as shown in FIG. 4B.

In other words, lock word 671 can either represent a flat monitor, or a pointer to a fat (conventional) monitor, according to the setting of a shape bit. The state of the monitor will depend on whether or not there is contention for the object (note that by contention here we mean contention for object proxy 670 on the local Java VM 650, not across the set of Java VMs).

In the example shown in FIG. 6, object proxy 670 is in its expanded state, so that the lock word points to the MI table 680, and more especially to the entry 681 in the MI table that locates within monitor pool 690 the specific (fat) monitor 691. Access to (proxy) object 670 can therefore be controlled by obtaining ownership of monitor 691. It will be appreciated that this configuration is directly analogous to FIG. 4B, with the exception that object 670 is really a local proxy for shared object 601, rather than a complete object in its own right. Alternatively, lock word 671 may be in its flat state, analogous to FIG. 4A, in which case it will contain the identity of the thread that owns object 601 and proxy 670 (or zero if there is currently no owner).

The client Java VM 650 also includes a table 660. This maps from an object key or identifier to the corresponding object proxy. Thus if field 604 in lock word 602 is set to the predefined value, table 660 is scanned to locate the entry 661 for the relevant object, and from this the corresponding object proxy 670 can be identified. Note that field 604 does not itself point to any particular entry in table 660, since field 604 is set to a predefined value for all shared objects. Rather, on finding the predefined value in field 604, the system knows that it has to scan table 660 in order to locate the relevant object key.

It will be appreciated that mirror table 660, object proxy 670, MI table 680 and monitor pool 690 are all on the same Java VM 650 as the thread performing the locking operation. Thus if a thread running on Java VM 650 attempts to lock a shared object 601, it looks at the lock word 602 for that object in shared memory 600, but on detecting the predefined value in field 604, it then performs all further operations on structures 660, 670, 680, 690 within its local address space. Consequently any lock obtained is only effective in relation to other threads running on the same client Java VM, thereby preserving the operational independence between different Java VMs.

Figure 7:
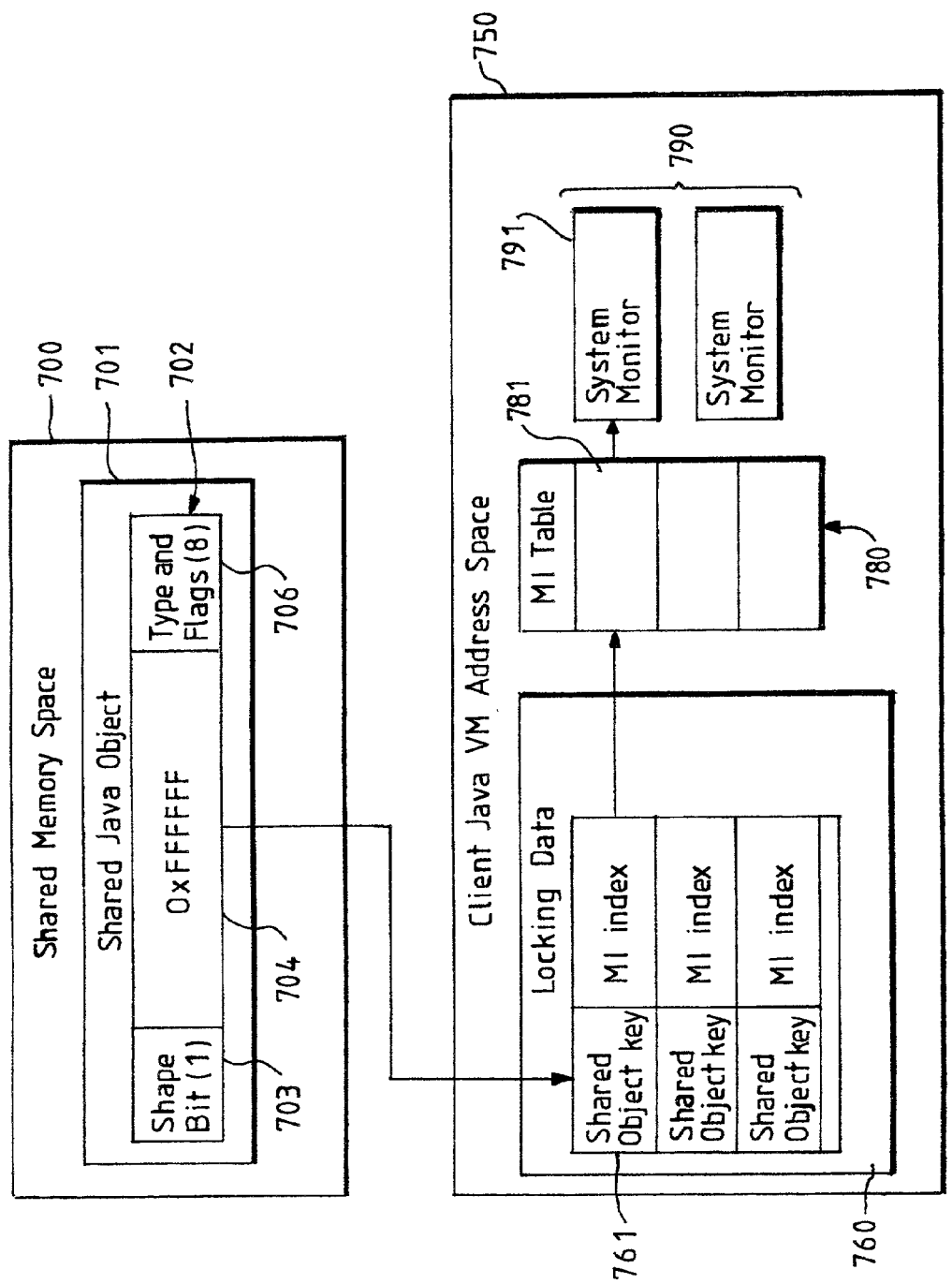
FIG. 7 illustrates the locking arrangement for a shared interned string object.

Turning now to interned strings, the handling of these is illustrated in FIG. 7. This depicts shared memory space 700 including shared interned string object 701, which includes lock word 702. This word is in its inflated state (as indicated by shape bit 703 being set to 1), and so contains three fields: shape bit 703, predefined value 704, and type and flag information 706. The predefined value 704 is stored in the field that for a normal inflated lock (see FIG. 4B) contains the index to the full monitor, but for a shared object this field is set to the predefined value of all 1's. The type and flags field indicates (amongst other things) that this object is an interned string type object.

FIG. 7 also depicts a client Java VM with its own (private) address space 750. This contains a pool of monitors 790 and MI table 780 that indexes into this pool, analogous to FIG. 4B. The client Java VM further contains lock data table 760. The purpose of this data is to allow a particular entry in MI table 780 to be identified for a given object key or identifier. Thus in order to locate the monitor for shared interned string object 701, the corresponding object key 761 must first be located in table 760. Note that field 704 in object 701 is set to a predefined value for all shared objects, and so does not point to key 761 (contrary to the situation in FIG. 4B for non-shared objects). Consequently, once object 701 has been recognised from fields 704 and 706 as a shared interned string object, it is necessary to search table 760 for the relevant entry 761. Once found, this entry points directly to the corresponding entry 781 in the MI table, which can then be used to identify the particular monitor 791 associated with object 701.

As with FIG. 6, if a thread running on Java VM 750 attempts to lock a shared object 701, it therefore looks at the lock word 702 for that object in shared memory 700, but on detecting the predefined value in field 704, it then performs all further operations on structures 760, 780, 790 within its local address space. Consequently any lock obtained is only effective in relation to other threads running on the same client Java VM, thereby preserving the operational independence between different Java VMs.

Note that one practical difference in configuration between FIG. 6 and FIG. 7 is that the arrangement of FIG. 6 supports bimodal locking of shared object 601, since proxy object 670 may be either in flat or inflated form. In contrast, in FIG. 7 there is no facility for storing a flat monitor for object 701 locally within client Java VM address space 750, so that the monitor for this object is always inflated.

This arrangement is largely a matter of convenience, since proxy objects 670 are provided for class objects for reasons other than locking, but are not provided for interned string objects. The performance penalty of not supporting flat monitors for shared interned string objects is likely to be very low, since locking on these objects is expected to be very rare. Moreover, a certain amount of time is required to go from the shared memory space 600/700 to the private memory space 650/750, so that the additional overhead of utilising a fat monitor compared to thin monitor is reduced compared to in a single Java VM configuration.

Nevertheless, it will be appreciated that the implementation of FIG. 7 could be modified, such that lock table 760 could function as a bimodal lock—in other words, any given entry such as for object key 761 would contain either a flat monitor, or an expanded monitor referencing MI table 780, depending on whether or not there was contention for object 701 on that particular Java VM. Conversely, the implementation of FIG. 6 could be modified so that lock word 671 is always inflated (i.e. this word never functions as a flat monitor).

Figure 8:
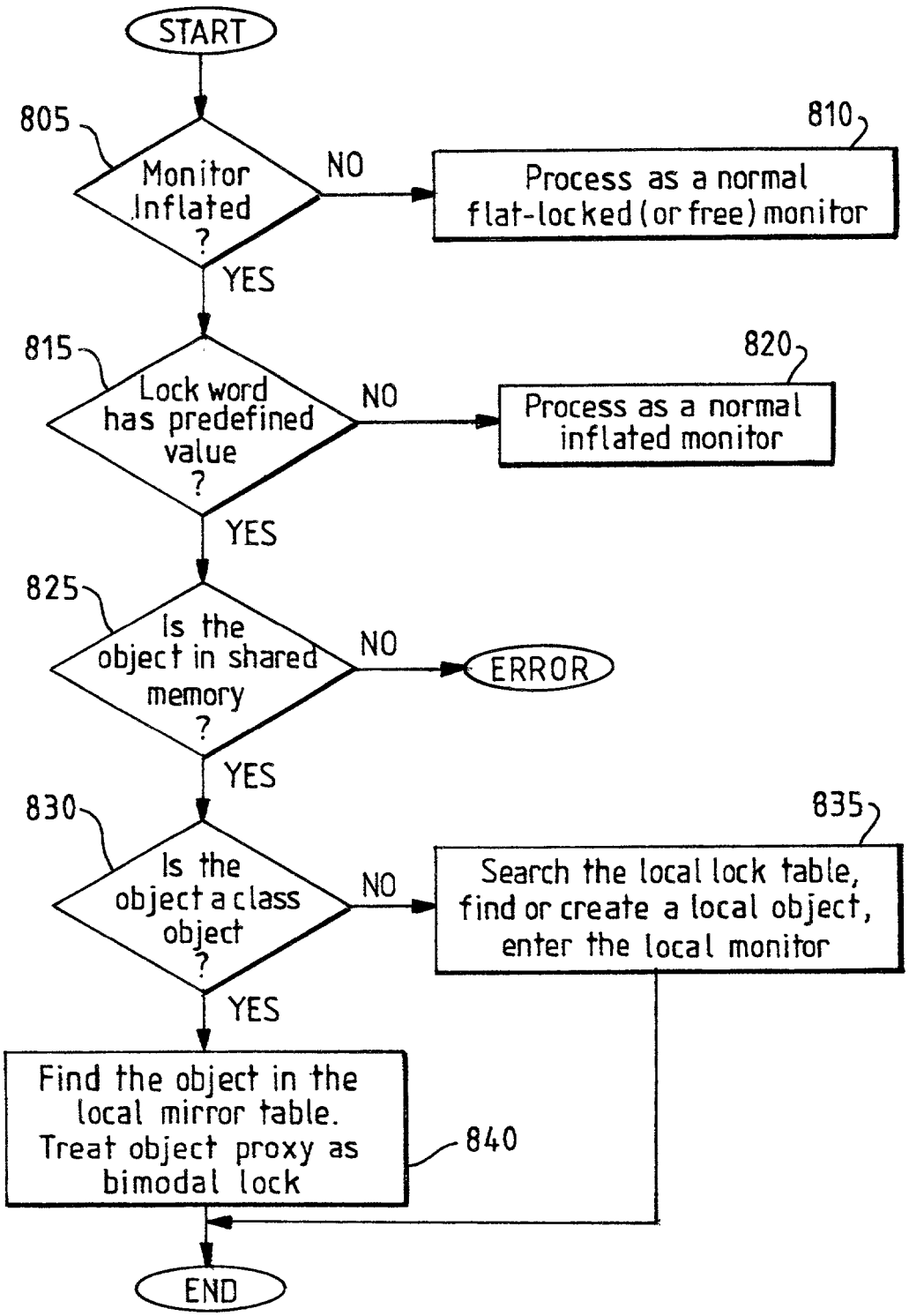
FIG. 8 is a flowchart illustrating a method of handling monitors that incorporates shared objects in accordance with the present invention.

FIG. 8 depicts a flowchart of monitor operations in a shared Java VM environment. The method starts by looking at the shape bit of the relevant object lock word to see whether or not the monitor is inflated (step 805). If not, then we know that the lock word represents a flat monitor for a non-shared object (as shown in FIG. 4A), and we can treat the monitor accordingly as either flat-locked or free (step 810). On the other hand, if the shape bit is set to indicate that the monitor is inflated, then we must examine the next field in the lock work (step 815). If this has a predefined value (all 1's in the preferred embodiment), then this indicates that the object is a shared object, and we proceed to step 825. If however the second field in the lock word does not have the predefined value, then it represents an index into the MI table (as in FIG. 4B), for a non-shared inflated monitor, and can be processed accordingly (step 820).

Returning to the case of a shared object, a check is made to confirm at step 825 that this object really is in shared memory space (600 in FIG. 6, 700 in FIG. 7)—if not there is an inconsistency in that the shared object is not in shared memory, and the method has to exit with an error. On the other hand, assuming that the shared object is located as it should be in shared memory, the method now proceeds to examine the type of object at step 830. In particular, a distinction is made according to whether the object is a class object or an interned string object. In the former case, we proceed to step 840, where we use the mirror table 660 to locate the relevant object proxy 670 on that Java VM (see FIG. 6), which can then be handled as a standard bimodal lock (step 840). In the latter case, we proceed to step 835, where we use the lock data 760 and MI table 780 to locate the corresponding system monitor 790 (see FIG. 7), which can then be treated as a standard inflated lock.

The description so far has focussed on monitor operations rather than object locking per se. In Java there are four basic lock operations, acquire and release (when starting and leaving synchronised code), and wait and notify (corresponding to the equivalent Java commands). The first step in each of these operations is to take ownership of or enter the relevant monitor for the object. This may entail queuing on the monitor if the monitor is already owned, i.e. if there is contention for the lock. Thus the process of FIG. 8 is best regarded as the steps necessary to enter a monitor, and will be performed for any lock operation. Note that the subsequent details of the lock operation are not detailed herein, since they are essentially unchanged from prior art (single Java VM) implementations. It will also be appreciated that the operations of FIG. 8 are performed essentially transparently to the application, which essentially does not notice any difference from conventional locking on a single Java VM.

One minor difference that can occur between different types of monitor operation is when a lock is initially acquired, since certain table entries may need creation at this point. This is true even on a prior art (single Java VM) implementation. For example, with reference to FIG. 4B, when a monitor is first inflated, it is necessary to create a corresponding entry in the MI table 430. Similarly for a shared class object, an entry in MI table 681 will have to be created when the monitor 671 is first inflated (see FIG. 6), and for an interned string object, entries in the lock data table 760 and the MI table 780 (see FIG. 7) must be created when the relevant object monitor is first accessed. (Note that entries may also need to be created in mirror table 660 in FIG. 6, although this table may be populated already to locate object proxies for reasons unrelated to locking).

One important concern with locking is that the system must be completely reliable to avoid unexpected conflicts. The locking mechanism described herein and as depicted in FIGS. 6 and 7 appears to have a relatively complex structure, involving two locking components, one in shared memory, one in local memory. However, it will be appreciated that since the lock word in shared memory never changes, and since all the locking is effectively deferred to the local Java VM structures (monitor pools 690, 790), there is no possibility of inconsistency. In other words, the locking mechanism described herein ultimately shares the same security as the locking mechanism of a single Java VM.

Note that in a practical implementation, certain other components of a conventional Java VM may need modification to cope with the revised locking structure described herein (as they would anyway to cope with the shared VM environment). One example of this relates to the Java Debugging interface (JVMDI), which has the facility to dump the monitors owned by a thread at a particular time. With reference to FIG. 6 for example, this requires the ability to trace back from monitor 691 to shared object 601, which is the object actually locked by the application. Such trace-back is possible from scanning the data structures on the client Java VM, in particular the mirror table 660, the proxy objects 670, and the MI table 670. This scanning will be relatively time-consuming and faster approaches could be developed; however it is generally accepted that performance in the debugging environment is a subsidiary consideration.

It will be appreciated that there are certain other ancillary modifications, apart from to the JVMDI, which will help to fully integrate locking in a shared object environment into a full-function Java VM. The identification and implementation of these is well within the competence of the skilled person.

It will further be appreciated that many there are many possible variations on the preferred embodiments described herein. For example, although the use of bimodal locking is preferred for performance reasons, it is also fully possible to use only conventional Java VM monitors. In this case there is no shape bit, but for a single system (non-shared) object the object lock word is simply an index to the MI table, and thence to the associated monitor; a shared object would then be indicated by a predefined value of this index, which would refer the lock back to the appropriate structures of the client Java VM (for example as shown in FIG. 6 or 7). In addition, whilst the preferred embodiment only supports certain types of shared objects (class files, and interned strings) it will be recognised that there may be additional or different types of shared objects, with or without proxies on the client Java VMs. More generally, although the preferred embodiments are implemented on a Java platform, it will be appreciated that the problem of locking shared objects is not limited to this platform, and accordingly the invention has a correspondingly wider applicability.

What is claimed is:

1. A computer implemented method of operating a shared object on a system comprising:
running a plurality of execution processes on each virtual machine of multiple virtual machines (VMs), said system including at least one object which is shared between the VMs so that the at least one object is accessed from two or more VMs, and at least one non-shared object is accessed only from a single VM, wherein an object contains a lock data word which for the at least one non-shared object can contain a reference to a monitor that controls access to the at least one non-shared object,
said method further comprises performing lock operations on a shared object by the steps of:
writing a predefined value into said lock data word for the shared object;
detecting the predefined value in the shared object which specifies that an object is shared by at least two VMs;
responsive to said detection, utilizing a monitor to control local access to the shared object for an execution process, said monitor being on the same VM as said execution process; and
updating a data structure only on the same VM as said execution process to associate said monitor with the shared object.

2. The method of claim 1, wherein said step of detecting that an object is a shared object comprises detecting that its lock data word contains said predefined value.

3. The method of claim 2, wherein the system supports bimodal locking, in which said lock data word can be set in a first mode to act as a flat monitor, and in a second mode to act as a reference to an inflated monitor.

4. The method of claim 3, wherein the lock data word includes a flag to indicate whether the lock data word is in said first or second mode, and said flag is set to the second mode for a shared object.

5. The method of claim 4, wherein the step of detecting that an object is a shared object further comprises the step of detecting that said flag is set to the second mode for the object.

6. The method of claim 1, wherein each VM includes a data structure to associate shared objects with monitors on that VM.

7. The method of claim 6, wherein said data structure includes a local proxy copy of the shared object.

8. The method of claim 7, wherein the local proxy copy of an object can contain a reference to a monitor that controls local access to the shared object.

9. The method of claim 8, wherein the local proxy copy can further function as a flat monitor to control local access to the shared object.

10. A computer implemented system for operating a shared object comprising:
multiple virtual machine (VMs), each VM running a plurality of execution processes, said system including at least one object which is shared between the VMs so that the at least one object is accessed from two or more VMs, and at least one non-shared object is accessed only from a single VM, wherein an object contains a lock data word which for the at least one non-shared object can contain a reference to a monitor that controls access to the at least one non-shared object,
said system further including means for performing lock operations on a shared object comprising:
means for writing a predefined value into said lock data word for the shared object;
means for detecting the predefined value in the shared object which specifies that an object is shared by at least two VMs;
a monitor for controlling local access to the shared object for an execution process, said monitor being on the same VM as said execution process; and
a data structure is updated only on the same VM as said execution process to associate said monitor with the shared object.

11. The system of claim 10, wherein said means for detecting that an object is a shared object comprises means for detecting that its lock data word contains said predefined value.

12. The system of claim 11, wherein said means for detecting that an object is a shared object comprises means for detecting that its lock data word contains said predefined value.

13. The system of claim 12, wherein the system supports bimodal locking, in which said lock data word can be set in a first mode to act as a flat monitor, and in a second mode to act as a reference to an inflated monitor.

14. The system of claim 13, wherein to lock data word includes a flag to indicate whether the lock data word is in said first or second mode, and said flag is set to the second mode for a shared object.

15. The system of claim 10, wherein each VM includes a data structure to associate shared objects with monitors on that VM.

16. The system of claim 15, wherein said data structure includes a local proxy copy of the shared object.

17. The system of claim 16, wherein the local proxy copy of an object can contain a reference to a monitor that controls local access to the shared object.

18. The system of claim 17, wherein the local proxy copy can further function as a flat monitor to control local access to the shared object.

19. A computer program comprising a set of instructions which is loaded into a machine cause it to perform the method of claim 1.

* * * * *